(12) United States Patent
Moore

(10) Patent No.: US 9,599,262 B1
(45) Date of Patent: Mar. 21, 2017

(54) SLEEVE TOOL AND METHOD OF USE

(71) Applicant: Robin C. Moore, Greencastle, IN (US)

(72) Inventor: Robin C. Moore, Greencastle, IN (US)

( * ) Notice: Subject to any disclaimer, the term of this patent is extended or adjusted under 35 U.S.C. 154(b) by 0 days.

(21) Appl. No.: 15/370,804

(22) Filed: Dec. 6, 2016

(51) Int. Cl.
    *F16L 21/06*     (2006.01)
    *F16L 23/032*     (2006.01)
    *F16L 21/08*     (2006.01)

(52) U.S. Cl.
    CPC ............... *F16L 21/06* (2013.01); *F16L 21/08* (2013.01); *F16L 23/032* (2013.01); *Y10T 29/49822* (2015.01); *Y10T 29/49909* (2015.01)

(58) Field of Classification Search
    CPC ......... F16L 21/06; F16L 21/08; F16L 23/032; Y10T 29/49822; Y10T 29/49909
    See application file for complete search history.

(56) References Cited

U.S. PATENT DOCUMENTS

| | | | |
|---|---|---|---|
| 3,186,739 A | 6/1965 | Mahoff | |
| 3,776,579 A | 12/1973 | Gale | |
| 4,008,937 A | 2/1977 | Filippi | |
| 4,346,428 A | 8/1982 | Gale | |
| 4,900,070 A | 2/1990 | Runkles et al. | |
| 5,188,400 A | 2/1993 | Riley et al. | |
| 6,880,859 B2 | 4/2005 | Breay et al. | |
| 7,144,047 B2 | 12/2006 | Dole | |
| 2013/0328307 A1 | 12/2013 | Irwin et al. | |

*Primary Examiner* — John C Hong
(74) *Attorney, Agent, or Firm* — Roberts IP Law; John Roberts

(57) ABSTRACT

A tool is disclosed for use in installing and removing a sleeve from a coupling, such as a flexible coupling assembly configured according to SAE Aerospace Standard AS1650, for example. The tool may comprise a pair of arcuate coupling halves pivotally joined at first adjacent ends and latchably connectable at second ends and comprising an inner profile closely interfacing with and circumferentially surrounding the outer surface of the sleeve, and providing a shoulder extending radially inward to abut a first edge of the sleeve while leaving radial clearance between the shoulder and the annular flanges of the coupling so that the sleeve, while removably held by the tool, may be longitudinally translated onto and off the coupling without mechanically interfering with the annular flanges.

19 Claims, 8 Drawing Sheets

SLEEVE TOOL AND METHOD OF USE

CROSS-REFERENCE TO RELATED APPLICATIONS

None.

FEDERALLY SPONSORED RESEARCH OR DEVELOPMENT

None.

TECHNICAL FIELD

The present invention relates generally to couplings connected in part with a sleeve, and more particularly, to a tool for removing and replacing such sleeves, and its method of use.

BACKGROUND

Couplings incorporating a sleeve, band, or ring are known in the art. See by way of example and not limitation the following United States patents and published patent application(s), all of which are incorporated herein by reference: US 2013/0328307 A1 by Irwin et al. published Dec. 12, 2013 (see "sleeve 524"); U.S. Pat. No. 7,144,047 B2 by Dole issued Dec. 5, 2006 (see "band 48"); U.S. Pat. No. 6,880,859 B2 by Breay et al. issued Apr. 19, 2005 (see "sleeve 68"); U.S. Pat. No. 5,188,400 A by Riley et al. issued Feb. 23, 1993 (see "sleeve 136"); U.S. Pat. No. 4,900,070 A by Runkles et al. issued Feb. 13, 1990 (see "coupling ring 20"); U.S. Pat. No. 4,346,428 A by Gale issued Aug. 24, 1982 (see "sleeve or band 24"); U.S. Pat. No. 4,008,937 A by Filippi issued Feb. 22, 1977 (see "seal ring-retaining sleeve 34"); U.S. Pat. No. 3,776,579 A by Gale issued Dec. 4, 1973 (see "seal ring-retaining sleeve 34"); U.S. Pat. No. 3,186,739 A by Mahoff issued Jun. 1, 1965 (see "sleeve member 14"). For purposes of this disclosure all such "sleeves," "bands," and "rings" used in such a manner in connection with such couplings are referred to herein as sleeves.

In practice, assembly of such sleeves into position on such a coupling can be difficult, because the two pipes, hoses, conduits, tubing, or other members being coupled together need to be abutted proximate one another and aligned axially while the sleeve is carefully slid laterally into place over the joint, while maintaining its own axial alignment with the members being coupled, all while compressing O-rings, packings, or other resilient materials between the sleeve and the members to form a seal. This difficulty in assembly is exacerbated when the entire structure is positioned in tight quarters, such as inside the wing of an airplane, in one non-limiting example.

Typically even more difficult than assembly of such sleeves into position on the coupling is the disassembly of such sleeves from a previously-assembled coupling, for instance for maintenance, inspection, or replacement. Over time, temperature and pressure fluctuations, as well as exposure to the external environment and chemicals within the connected members, tend to cause the sleeve to stick in-place on the coupling. Getting the sleeve "un-stuck" can be quite difficult, especially when the entire structure is positioned in tight quarters and the members that are coupled together cannot be pulled apart from one another in an axial direction, as is the case in many aviation installations, for example. In practice, what often happens is that a screwdriver or other makeshift tool is used to apply lateral force to the sleeve in an attempt to break it loose and slide it laterally, i.e., in the axial direction of the centerline of the sleeve and the coupled members. But such prying, hammering, gouging, and the like is typically not very effective at moving the sleeve, and tends to damage the sleeve, including in ways that might not be apparent. This is problematic because such sleeves are often re-used. A damaged sleeve could compromise the seal of the coupling, which could lead to catastrophic results in applications such as fuel lines in airplanes, in one non-limiting example.

Accordingly, what is needed is a reliable and repeatable way to easily facilitate safe installation and removal of a sleeve into position on a coupling without damaging the sleeve, especially in situations where the entire structure is positioned in tight quarters, and/or the members that are coupled together cannot be pulled apart from one another in an axial direction.

SUMMARY

The present invention achieves all these goals and more by providing in various example embodiments a tool adapted for use in installing and removing a sleeve from a coupling, such as a flexible coupling, for example, wherein the sleeve may comprise an annular body having an outer surface separated from an inner surface by a thickness and extending longitudinally about a center axis from a first edge to a second edge, the sleeve configured to sealably connect first and second fluid carrying members by circumferentially surrounding and radially sealing against first and second annular sealing members attached with first and second annular flanges on confronting ends of the first and second fluid carrying members. In various example embodiments the tool may comprise a pair of arcuate coupling halves pivotally joined at first adjacent ends and latchably connectable at second ends and comprising an inner profile sized and shaped to closely interface with and circumferentially surround the outer surface of the sleeve, the arcuate coupling halves further comprising a shoulder extending radially inward from a first end of the inner profile, the shoulder sized and shaped to closely interface with and at least partially surround the first edge of the sleeve while leaving radial clearance between the shoulder and the first and second annular flanges.

In various example embodiments the outer surface of the sleeve may comprise annular first ridges and first grooves spaced apart longitudinally about the center axis, and the inner profile of the arcuate coupling halves may comprise annular second grooves and second ridges sized and shaped to closely interface with the respective annular first ridges and first grooves in the outer surface of the sleeve. In various example embodiments the arcuate coupling halves further comprise a tapered surface extending from a second end of the inner profile, longitudinally away from and radially outward from the second end of the inner profile. In various example embodiments the arcuate coupling halves are pivotally joined at the first adjacent ends by a hinge connected to an outer profile of the arcuate coupling halves. In various example embodiments the arcuate coupling halves are latchably connectable at the second ends by a latching mechanism connected to an outer profile of the arcuate coupling halves. In various example embodiments the arcuate coupling halves further comprise an annular outer profile, which may have dimensional variations configured to facilitate a user gripping the tool. In various example embodiments the first and second annular sealing members comprise resilient O-rings positioned in grooves in the first and second annular flanges. In various example embodiments the first and second annular sealing members comprise deformable packings positioned in grooves in the first and second annular flanges. In various example embodiments the coupling may comprise a threadless, flexible, self-bonding coupling assembly configured according to SAE Aerospace Standard AS1650, and the inner profile of the pair of arcuate coupling halves may be sized and shaped to closely interface with and circumferentially surround the outer surface of a sleeve forming part of a threadless, flexible, self-bonding coupling assembly configured according to SAE Aerospace Standard AS1650.

Also provided in various example embodiments is a method of installing a sleeve as described herein to sealably connect first and second fluid carrying members as described herein, wherein the method may comprise the steps of: providing a tool as described herein; opening the pair of arcuate coupling halves by pivoting them away from each other about the first adjacent ends; positioning the sleeve between the pair of arcuate coupling halves; closing the pair of arcuate coupling halves around the sleeve by pivoting the pair of arcuate coupling halves toward each other about the first adjacent ends so that the inner profile of arcuate coupling halves closely interfaces with and circumferentially surrounds the outer surface of the sleeve and so the shoulder closely interfaces with and at least partially surrounds the first edge of the sleeve; latching together the latchably connectable second ends of the arcuate coupling halves; positioning the first and second fluid carrying members so that the first and second annular flanges confront one another and are in at least approximate axial alignment; while using the tool to hold the sleeve latched therein, longitudinally translating the sleeve along and around the first fluid carrying member and over the first and second annular flanges until the sleeve circumferentially surrounds and radially seals against the first and second annular sealing members attached with the first and second annular flanges; unlatching the latchably connectable second ends of the arcuate coupling halves; opening the pair of arcuate coupling halves by pivoting them away from each other about the first adjacent ends; and removing the tool from the sleeve.

In various example embodiments wherein the arcuate coupling halves further comprise a tapered surface extending from a second end of the inner profile, longitudinally away from and radially outward from the second end of the inner profile, the method may further comprise the steps of: while using the tool to hold the sleeve latched therein, longitudinally translating the sleeve over the first and second annular flanges so that the tapered surface travels over the first and second annular flanges. In various example embodiments wherein the coupling comprises a threadless, flexible, self-bonding coupling assembly configured according to SAE Aerospace Standard AS1650, the method may further comprise the steps of clamping a clamshell-style clamp around the sleeve and the first and second annular flanges.

Further provided in various example embodiments is a method of removing a sleeve as described herein from sealably connecting first and second fluid carrying members as described herein, wherein the method may comprise the steps of: providing a tool as described herein; opening the pair of arcuate coupling halves by pivoting them away from each other about the first adjacent ends; positioning the sleeve between the pair of arcuate coupling halves; closing the pair of arcuate coupling halves around the sleeve by pivoting the pair of arcuate coupling halves toward each other about the first adjacent ends so that the inner profile of arcuate coupling halves closely interfaces with and circumferentially surrounds the outer surface of the sleeve and so the shoulder closely interfaces with and at least partially surrounds the first edge of the sleeve; latching together the latchably connectable second ends of the arcuate coupling halves; and while using the tool to hold the sleeve latched therein, longitudinally translating the sleeve over the first and second annular flanges until the sleeve no longer sealably connects the first and second fluid carrying members.

In various example embodiments the method may further comprise the steps of longitudinally translating the sleeve over the first annular flange while the shoulder passes over and does not interfere with the first annular flange, while using the tool to hold the sleeve latched therein. In various example embodiments the method may further comprise longitudinally translating the sleeve over the second annular flange while the shoulder passes over and does not interfere with the second annular flange, using the tool to hold the sleeve latched therein. In various example embodiments the method may further comprise the steps of positioning the first and second fluid carrying members so that there is sufficient space between them to remove the sleeve from there between, and removing the sleeve from between the first and second fluid carrying members. In various example embodiments the method may further comprise the steps of unlatching the latchably connectable second ends of the arcuate coupling halves, opening the pair of arcuate coupling halves by pivoting them away from each other about the first adjacent ends, and removing the tool from the sleeve. In various example embodiments wherein the coupling may comprise a threadless, flexible, self-bonding coupling assembly configured according to SAE Aerospace Standard AS1650, the method may further comprise the steps of unclamping and removing a clamshell-style clamp from around the sleeve and the first and second annular flanges.

Many other aspects of the invention will be apparent in view of the example embodiments discussed in the following Figures and Detailed Description, which may be modified and applied to other couplings, for instance like those shown in the art incorporated herein.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing a non-limiting example of the invention.

FIG. 3-1 is a longitudinal section taken substantially along lines 3-3 of FIG. 1 with the clamshell-style clamp removed and the example sleeve not yet installed on the example coupling.

FIG. 3-2 is the longitudinal section of FIG. 3-1 shown with an example sleeve tool installed on the example sleeve for purposes of installing the sleeve on the coupling according to various example embodiments.

FIG. 3-3 is the longitudinal section of FIG. 3-2 shown with the example sleeve installed on the example coupling using the example tool installed on the sleeve according to various example embodiments.

FIG. 3-4 is the longitudinal section of FIG. 3-3 shown with the example tool removed from the example sleeve.

Figures 1, 3:
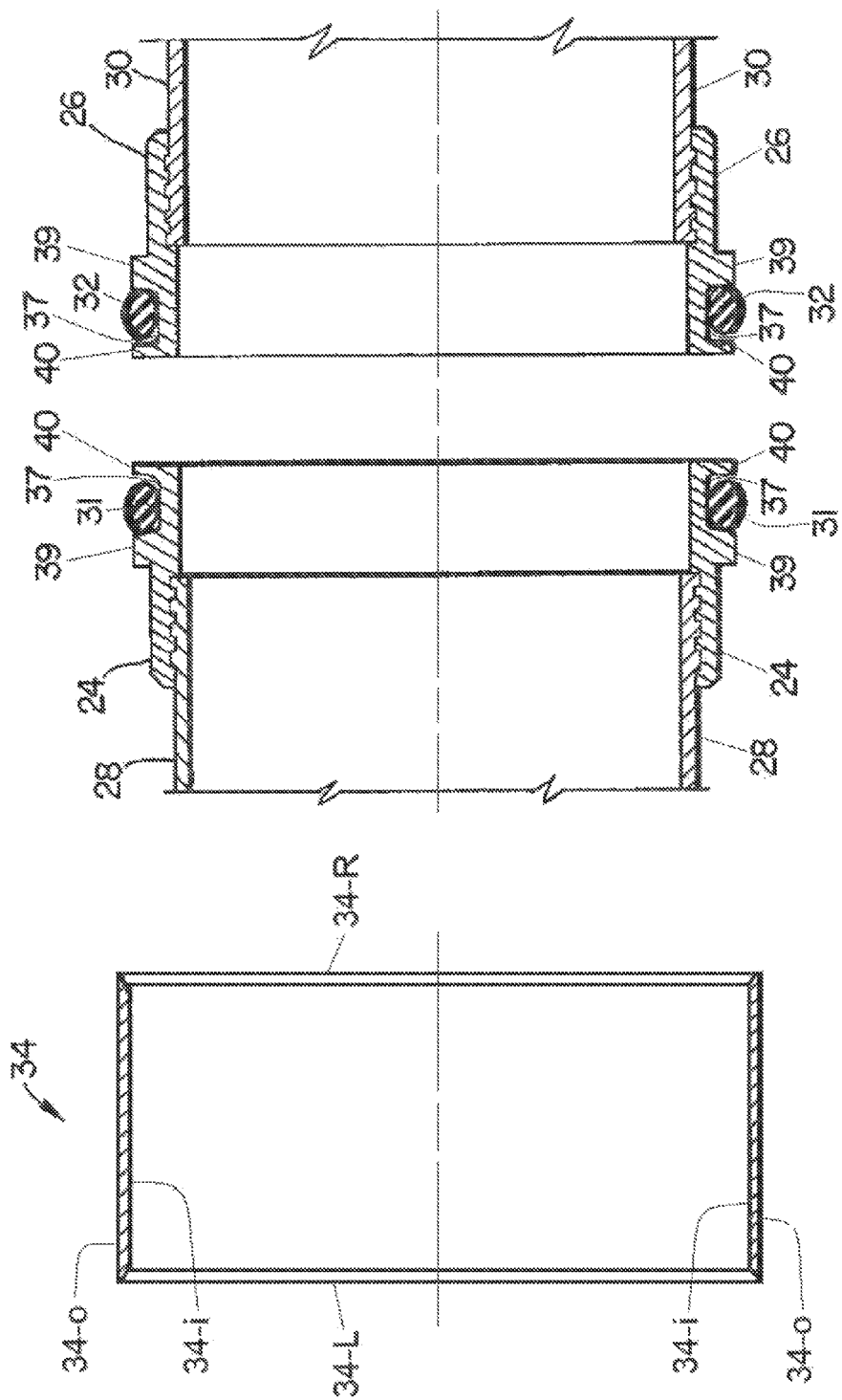
Figures 2, 3:
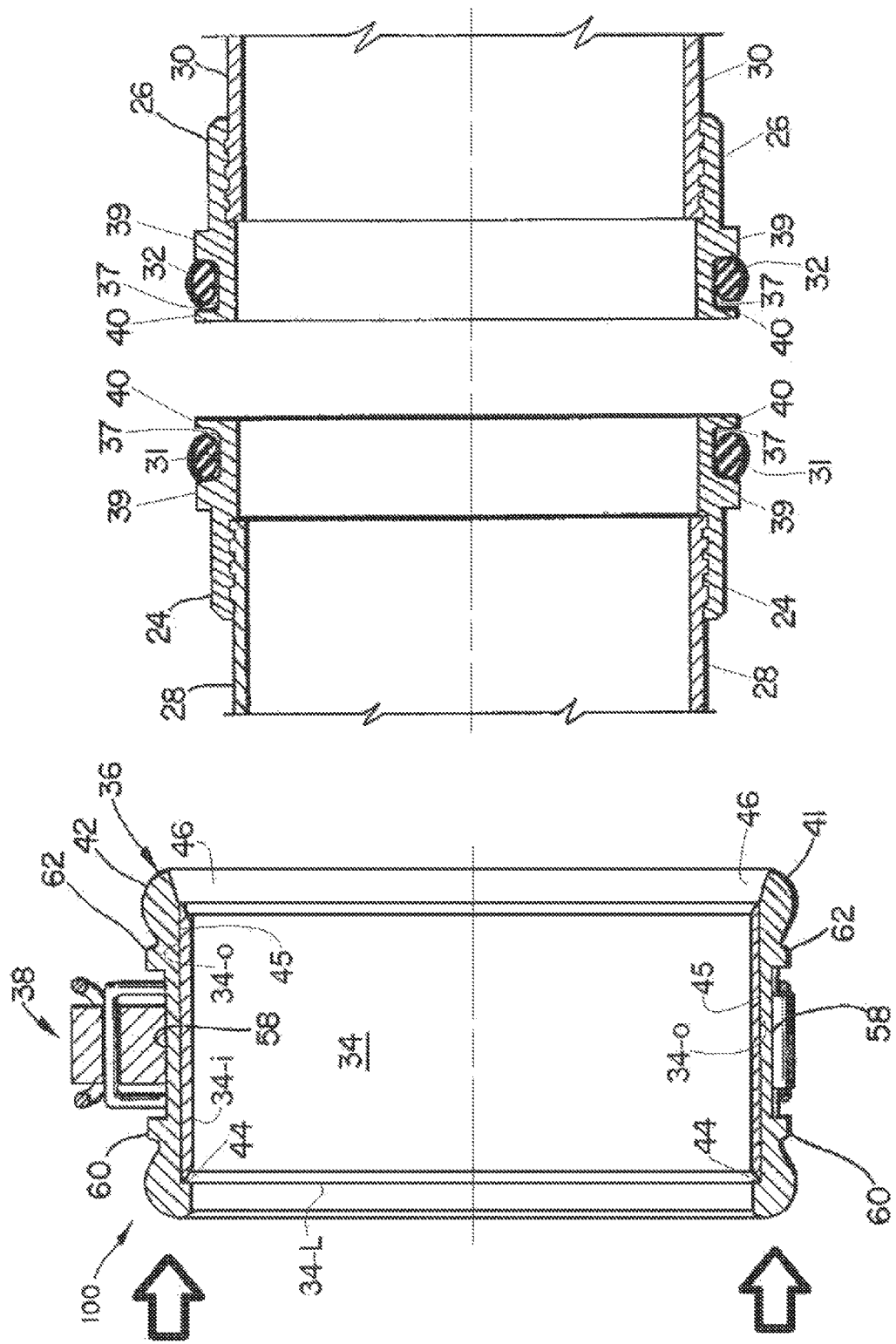
Figure 3:
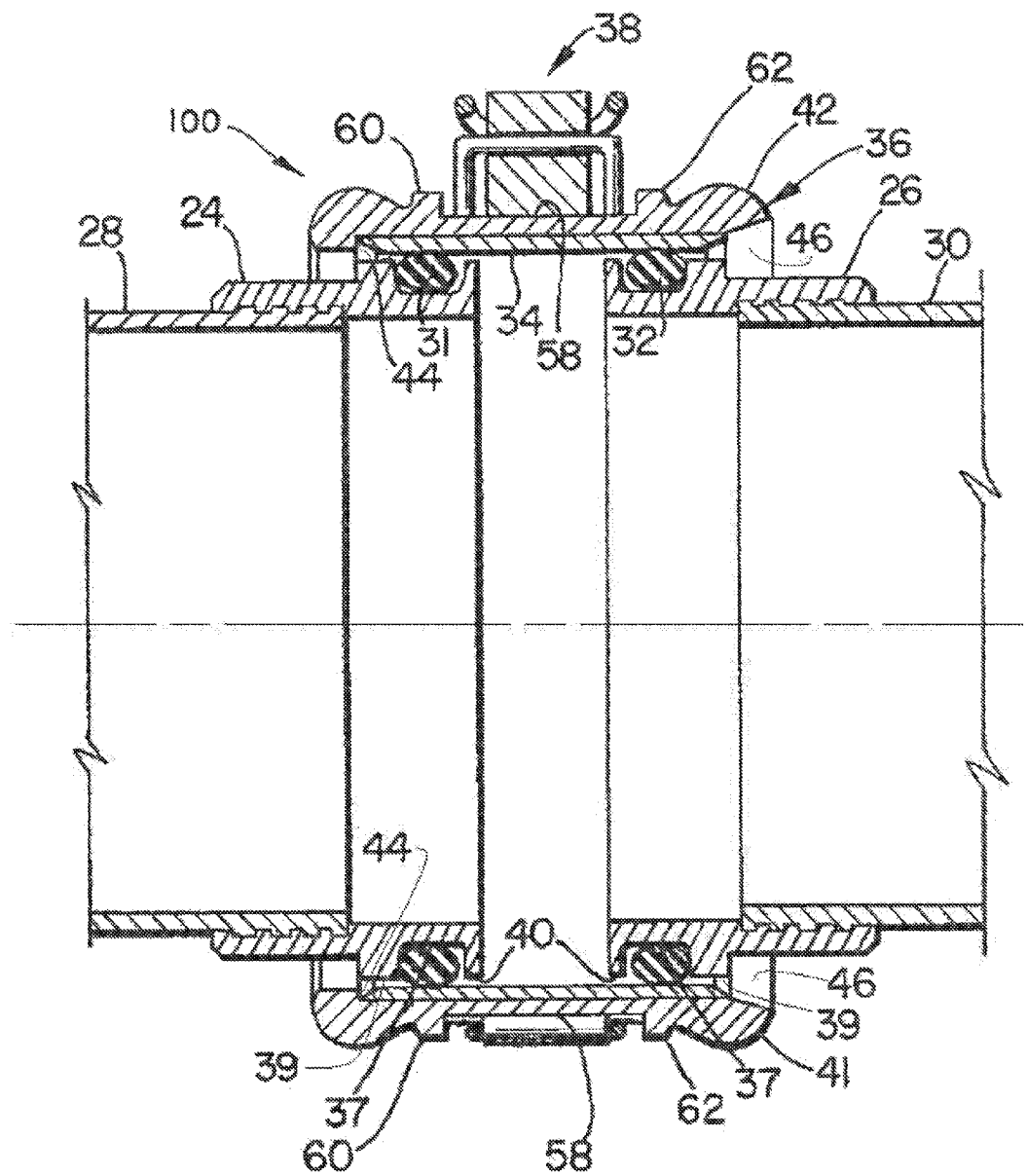
Figures 3, 4:
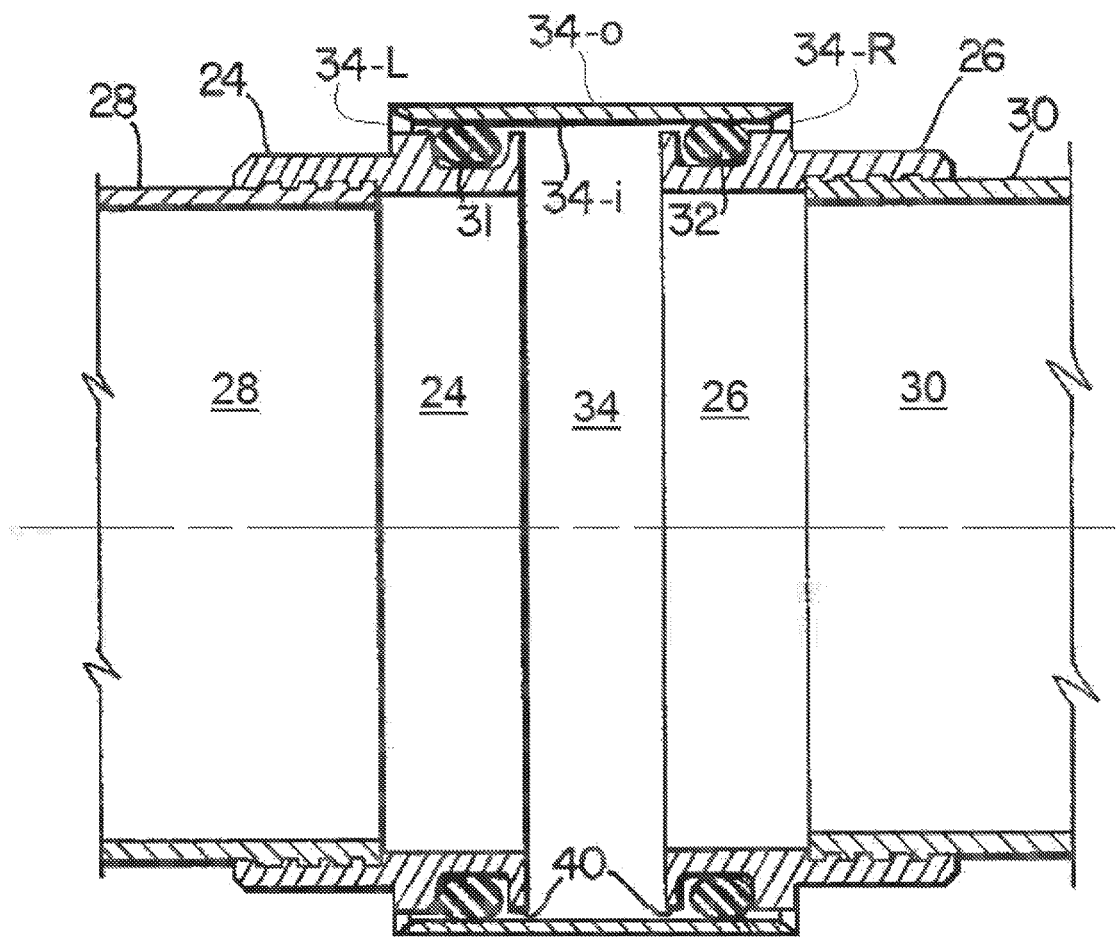

For reference, FIGS. 3 and 4 of U.S. Pat. No. 4,008,937 A, separately incorporated herein by reference, show the example coupling of present FIG. 3-4 fully assembled, with a clamshell-style clamp (336 in present FIG. 1) installed around the sleeve.

Figures 3, 4, 5:
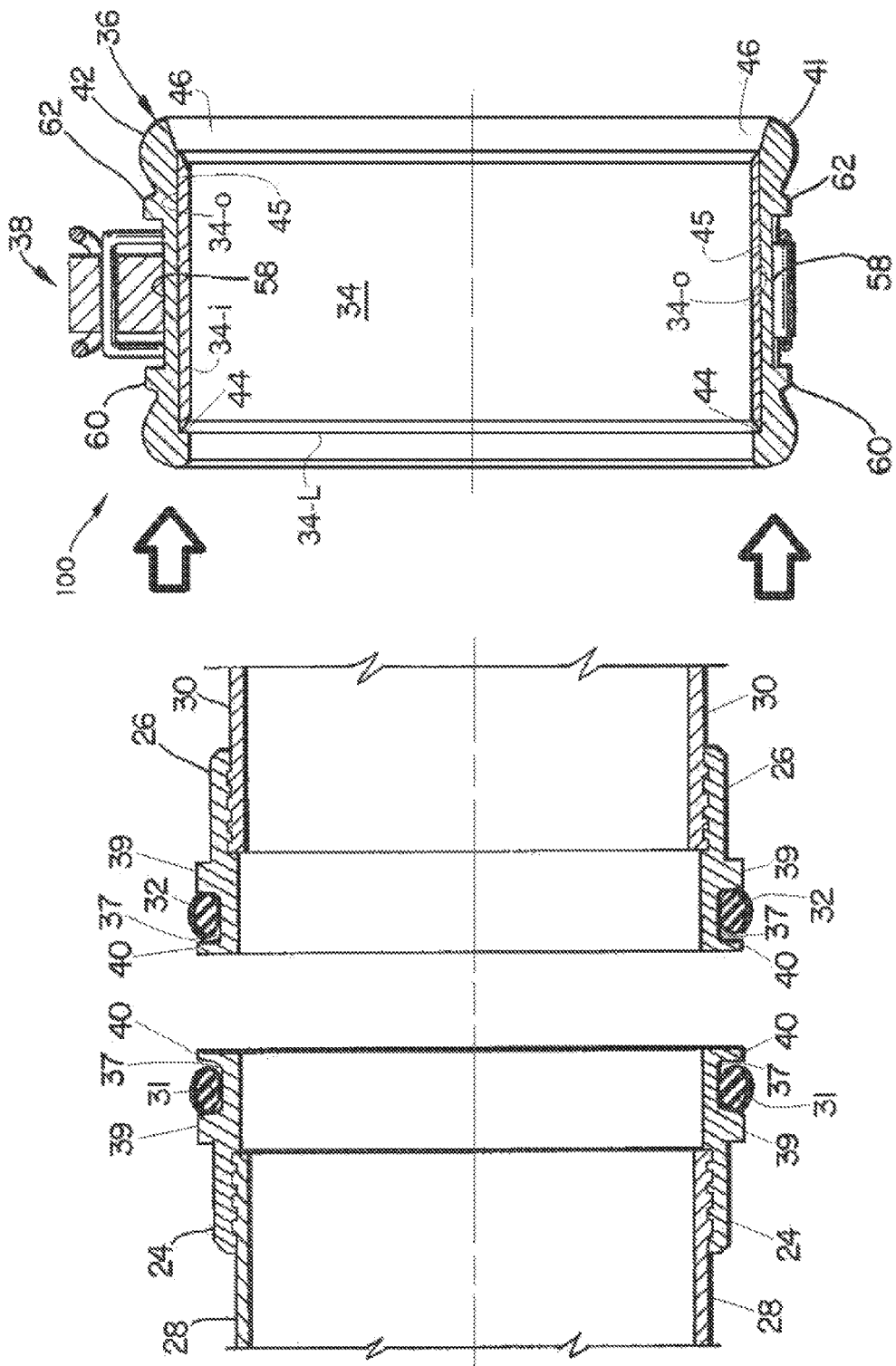

FIG. 3-5 is the longitudinal section of FIG. 3-4 shown with an example sleeve tool installed on the example sleeve for purposes of removing the sleeve from the coupling according to various example embodiments.

FIG. 3-6 is a longitudinal section of FIG. 3-5 shown with the sleeve removed from the example coupling and the tool removed from the sleeve according to various example embodiments.

DETAILED DESCRIPTION

Reference is made herein to some specific examples of the present invention, including any best modes contemplated by the inventor for carrying out the invention. Examples of these specific embodiments are illustrated in the accompanying Figure(s). While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
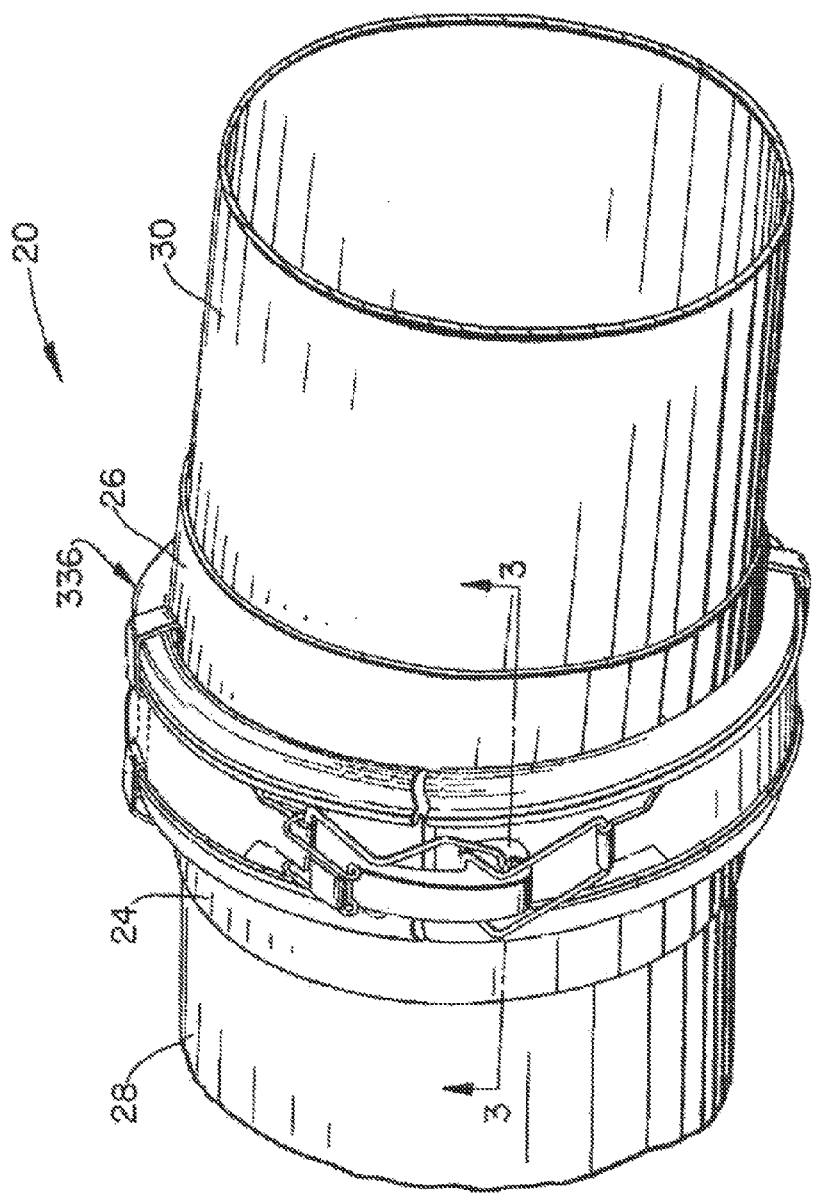
FIG. 1 is a perspective view of an example coupling assembly known in the art, which uses a sleeve (not shown in FIG. 1) surrounded by clamshell-style clamp 336 for coupling together a pair of tubular members, which assembly may benefit from using the present tool to install and/or remove the sleeve according to various example embodiments.

Referring to the Figures and particularly to FIG. 1, an example threadless, flexible clamshell-type coupling assembly that may be operated upon with the present invention is generally indicated at 20 and comprises a pair of flanged, confronting fluid-conveying members 24 and 26 of tubular configuration. Clamshell couplings, threaded couplings, and spherical flange couplings may all be used in connection with the present invention to the extent they can benefit from a sleeve installation and/or removal tool. In the example shown in FIG. 1, members 24 and 26 may be rigidly fixed to the ends of tubular fluid-conveying conduits 28 and 30. Conduits 28 and 30 may be utilized to convey fluids under pressure, for example. Example military and commercial applications include fuel systems, environmental control systems, oxygen systems, potable water and vacuum drain systems. Fluids conveyed may be liquids or gasses or both. Members 24 and 26 may be coaxially swaged on the ends of conduits 28 and 30 as shown in the Figures.

As shown throughout the Figures, an example coupling assembly 20 may include a pair of resilient sealing rings 31 and 32, a seal ring-retaining sleeve, band, or ring (collectively or alternatively, "sleeve 34"), a longitudinally split annular coupler, or clamshell-type coupler, 336 (FIG. 1). Seal rings 31 and 32 are typically formed from any suitable elastically deformable material, such as elastomeric O-rings, or packings, or any other resilient sealing material(s). Members 24 and 26 may be of any suitable construction, for instance as described in the previously incorporated U.S. Pat. No. 3,776,579. As shown, each of the members 24 and 26 may have a radially outward opening annular groove 37 which receives one of the seal rings 31 and 32 and which is defined by a pair of axially spaced apart, annular, radially extending shoulders or flanges 39 and 40 (see, e.g., FIGS. 2 and 3-1).

In various example embodiments where the coupling 20 is a flexible coupling, member 24 may be positioned so that its axis axially aligns with the axis of sleeve 34 or it may selectively be angulated or angularly deflected relative to sleeve 34 so that its axis transversely intersects the axis of sleeve 34. Similarly, member 26 may be positioned so that its axis axially aligns with the axis of sleeve 34, or it may selectively be angulated or angularly deflected so that its axis transversely intersects the axis of sleeve 34.

Figure 2:
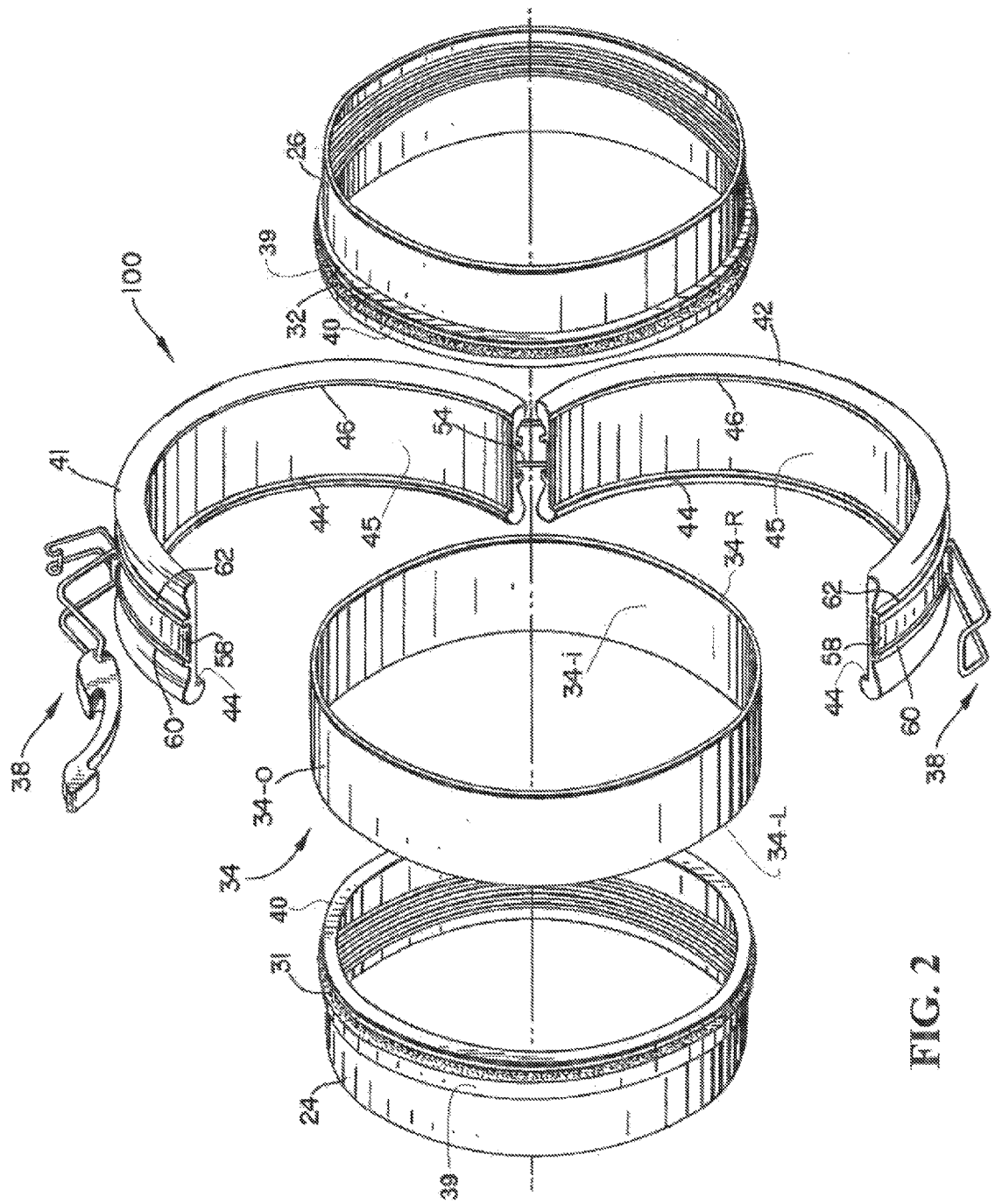
FIG. 2 is an exploded perspective view of the example coupling assembly shown in FIG. 1 with the clamshell-style clamp 336 removed and replaced with an example sleeve tool 100 according to various example embodiments.

As best shown in FIGS. 2 and 3-4, sleeve 34 may comprise an annular shape with an inner surface 34-*i* and an outer surface 34-*o* and extending longitudinally about its center axis from a first edge 34-L to a second edge 34-R, positioned in use so as to axially bridge or span the space between the opposed end faces of members 24 and 26 and peripherally surround and seat against seal rings 31 and 32. Grooves 37 may be sufficiently shallow so that the outer peripheral portions of seal rings 31 and 32 protrude radially beyond the groove-defining shoulders 39, 40 of members 24 and 26 and are consequently deformed against a smooth, cylindrical inner periphery 34-*i* of sleeve 34. In this manner, ring 31 establishes a fluid-tight seal between member 24 and sleeve 34, and ring 32 establishes a fluid-tight seal between member 26 and sleeve 34.

Sleeve 34 may be of any suitable construction, for example like the construction of the seal ring-engaging sleeve in the coupling described in U.S. Pat. No. 3,776,579. The outer periphery 34-*o* of sleeve 34 may have been roughened to enable a person to grip the sleeve more firmly in the course of assembling sleeve 34 on members 24 and 26, which can be quite difficult without the present tool 100. For example, the outer peripheral surface of sleeve 34 may have been roughened by sand blasting. Alternatively, the outer peripheral surface of sleeve 34 may be provided with corrugations, i.e., adjacent annular grooves and ridges (not shown), to provide a rough gripping surface in an attempt to keep the sleeve from slipping in the user's hand as he or she forces the sleeve 34 over seal rings 31 and 32. If the outer periphery 34-*o* of sleeve 34 is provided with such corrugations or other dimensional variations, the mating inner surface 45 of tool 100 may be provided with corresponding corrugations or other dimensional variations so that the profile of the surface 45 of the tool 100 that engages that outer periphery of the sleeve 34-*o* closely interfaces with the profile of the surface 34-*o* of the sleeve 34. By using the tool 100 as described herein, sleeve 34 is much more easily assembled on and dissembled off members 24 and 26, because the tool 100 is much easier to grip and apply force to than the typically delicate, thin-walled sleeve 34.

As shown in FIGS. 2, 3-2, 3-3, and 3-5, in various example embodiments, tool 100 is constructed so as to peripherally surround sleeve 34, and may be longitudinally divided along a radial plane into two complemental separately formed coupling halves 41 and 42 pivotally connected at their respective first ends by a hinge 54. Any suitable structure may be employed for hinge 54, such as a barrel hinge, piano hinge, or any of the pivoting structures disclosed in any of the art incorporated herein, which may be formed as part of the halves 41 and 42, or attached thereto by any suitable means, such as by fasteners, rivets, or welding. Each of the tool halves 41 and 42 may be sized, shaped, and otherwise constructed to arcuately extend substantially 180° around sleeve 34 and seat against the outer periphery of sleeve 34-*o*. A latching mechanism 38, such as the example toggle lock assembly described in U.S. Pat. No. 4,008,937 A (incorporated herein by reference), releasably secures coupling halves 41 and 42 together in assembled relation circumferentially around sleeve 34. It will be understood that any suitable latching mechanism 38 may be employed, for instance like those shown in the other art incorporated herein by reference. The tool 100 may be formed from any material having suitable mechanical properties, such as metal or plastic. In one example embodiment aluminum is used.

Each of the coupler halves 41 and 42 may be formed with a radially inwardly extending shoulders or flange 44 on a first side, and optionally a radially outwardly extending concave chamfer portion 46 on a second side opposite the first side. In one alternative embodiment, a shoulder or flange 44 as described herein may be provided on both the first and second sides of the coupler halves 41 and 42 (not shown). In use, a first side 34-L of the sleeve 34 is disposed so as to be axially abuttable with the shoulder 44 on coupling halves 41 and 42 so that shoulder 44 can orient and apply axial force to the sleeve 34 to assist in the installation and removal of the sleeve 34 from the coupling 20.

As shown and described in U.S. Pat. No. 4,008,937 A (col. 6, lines 9-37), a clamshell-style coupling (336 in present FIG. 1) typically surrounds and mechanically interferes with outward axial movement of shoulders 39 to prevent the axial separation of members 24 and 26 when fluid under pressure is conveyed through conduits 28 and 30. In contrast to such clamshell-style couplers, the present tool 100 has an inner diameter of its shoulder 44 that is small enough for the shoulder 44 to engage a first side 34-L of the sleeve 34, while at the same time the inner diameter of the shoulder 44 is larger than the outer diameter of the shoulders 39, 40 of the members 24, 26, so that the tool 100, while holding the sleeve 34, does not mechanically interfere with shoulders 39 and can move longitudinally over both the shoulders 39 and 40 to facilitate installation and removal of the sleeve 34 as depicted in example FIGS. 3-2, 3-3, and 3-5.

To facilitate a user's grip on the tool 100, the outer peripheral surface 58 of coupling halves 41 and 42 may optionally be provided with dimensional variations, such as, for example, a pair of exterior, circumferentially extending axially spaced apart ridges 60 and 62.

With specific reference to the non-limiting example embodiment shown in the present Figures, provided in various example embodiments is a tool 100 adapted for use in installing and removing a sleeve 34 from a coupling 20, such as a flexible coupling 20, for example, wherein the sleeve 34 may comprise an annular body having an outer surface 34-*o* separated from an inner surface 34-*i* by a thickness (typically thin-walled, as shown), and extending longitudinally about a center axis (centerline shown) from a first edge 34-L to a second edge 34-R, the sleeve 34 configured to sealably connect first and second fluid carrying members 28, 30 by circumferentially surrounding and radially sealing against first and second annular sealing members 31, 32 attached with first and second annular flanges 24, 26 on confronting ends of the first and second fluid carrying members 28, 30. In various example embodiments the tool 100 may comprise a pair of arcuate coupling halves 41, 42 pivotally joined at first adjacent ends 54 and latchably connectable at second ends 38 and comprising an inner profile 45 sized and shaped to closely interface with and circumferentially surround the outer surface 34-*o* of the sleeve 34, the arcuate coupling halves 41, 42 further comprising a shoulder 44 extending radially inward from a first end of the inner profile 45, the shoulder 44 sized and shaped to closely interface with and at least partially surround the first edge 34-L of the sleeve 34 while leaving radial clearance between the shoulder 44 and the shoulders 39, 40 of the first and second annular flanges 24, 26.

In various example embodiments the outer surface 34-*o* of the sleeve 34 may comprise annular first ridges and first grooves spaced apart longitudinally about the center axis (not shown, but described in U.S. Pat. No. 4,008,937 at Col. 5, lines 52-57, previously incorporated herein), and the inner profile of the arcuate coupling halves may comprise annular second grooves and second ridges sized and shaped to closely interface with the respective annular first ridges and first grooves in the outer surface of the sleeve. Any other surface profile variations may be correspondingly applied to the mating surfaces 34-*o* and 45, as would be apparent to persons of skill in the art in view of this disclosure. As best seen in FIGS. 3-2 and 3-5, in various example embodiments the arcuate coupling halves 41, 42 may further comprise a tapered surface 46 extending from a second end of the inner profile, longitudinally away from and radially outward from the second end of the inner profile 45 (i.e., a concave surface 46). In various example embodiments the arcuate coupling halves 41, 42, are pivotally joined at the first adjacent ends by a hinge 54 connected to an outer profile 58 of the arcuate coupling halves 41, 42. In various example embodiments the arcuate coupling halves 41, 42 are latchably connectable at the second ends by a latching mechanism 38 connected to an outer profile 58 of the arcuate coupling halves 41, 42. In various example embodiments the arcuate coupling halves 41, 42 further comprise an annular outer profile 36, which may have dimensional variations 60, 62 configured to facilitate a user gripping the tool 100. In various example embodiments the first and second annular sealing members 31, 32 comprise resilient O-rings positioned in grooves 37 in the first and second annular flanges 24, 26. In various example embodiments the first and second annular sealing members 31, 32 comprise deformable packings positioned in grooves 37 in the first and second annular flanges 24, 26. In various example embodiments the coupling 20 may comprise a threadless, flexible, self-bonding coupling assembly 20 configured according to SAE Aerospace Standard AS1650, the details of which are publicly available and are known in the art, and the inner profile 45 of the pair of arcuate coupling halves 41, 42 may be sized and shaped to closely interface with and circumferentially surround the outer surface 34-o of a sleeve 34 forming part of a threadless, flexible, self-bonding coupling assembly 20 configured according to SAE Aerospace Standard AS1650.

Figures 3, 4, 5, 6:
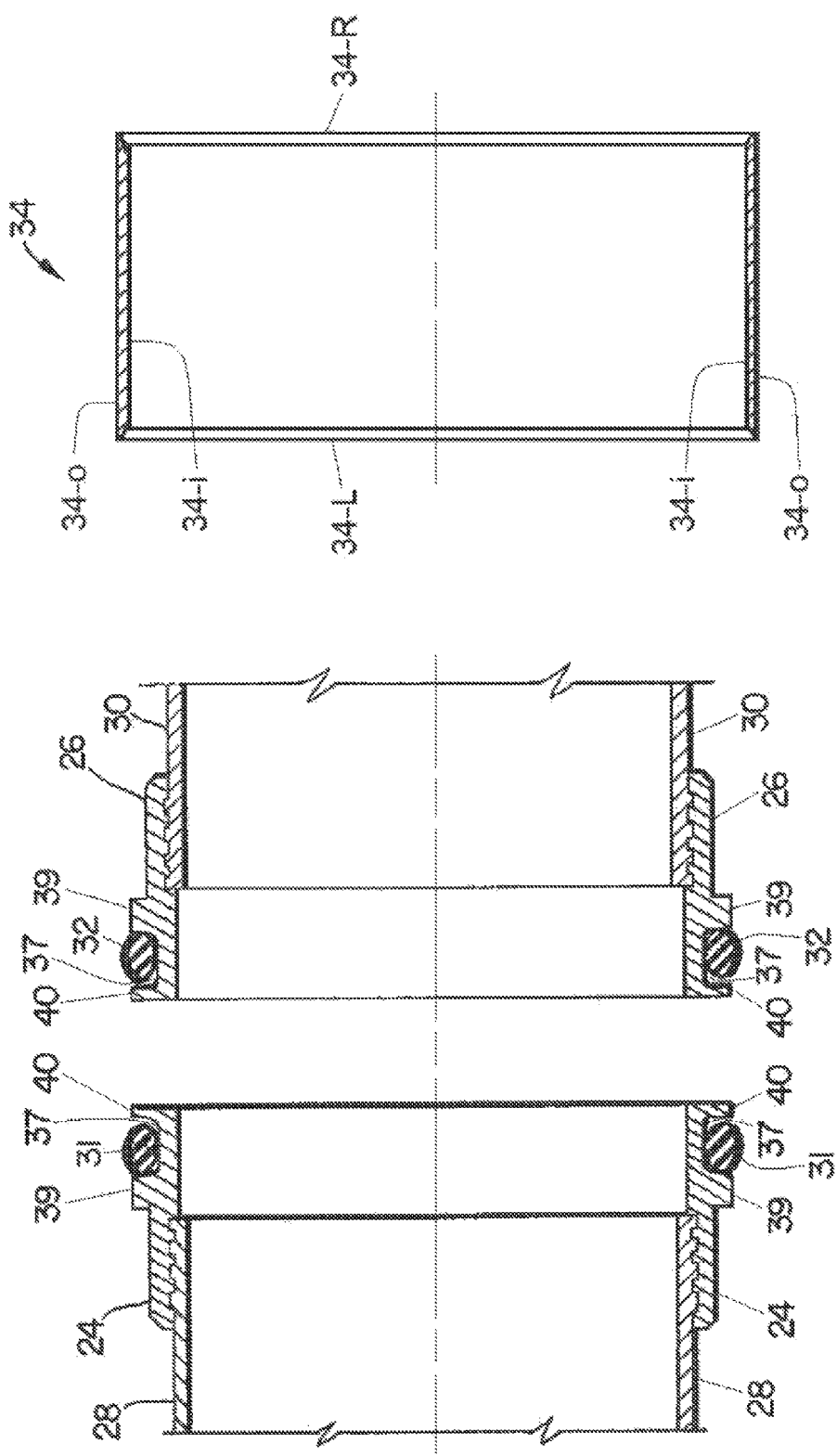

An example method of using an example sleeve tool 100 will now be discussed with reference to FIGS. 2 through 3-6. Provided in various example embodiments is a method of installing a sleeve 34 as described herein to sealably connect first and second fluid carrying members 28, 30 as described herein, wherein the method may comprise the steps of: providing a tool 100 as described herein; opening the pair of arcuate coupling halves 41, 42 as shown in FIG. 2 by pivoting them away from each other about the first adjacent ends 54; positioning the sleeve 34 between the pair of arcuate coupling halves 41, 42 as shown in FIG. 2; closing the pair of arcuate coupling halves 41, 42 around the sleeve 34 by pivoting the pair of arcuate coupling halves 41, 42 toward each other about the first adjacent ends 54 so that the inner profile 45 of arcuate coupling halves 41, 42 closely interfaces with and circumferentially surrounds the outer surface 34-o of the sleeve 34 and so the shoulder 44 closely interfaces with and at least partially surrounds the first edge 34-L of the sleeve 34, for instance as shown in FIG. 3-2. A user may then latch together the latchably connectable second ends of the arcuate coupling halves 41, 42, for instance using latching mechanism 38 or any other suitable latching mechanism. A user may position the first and second fluid carrying members 28, 30, so that the first and second annular flanges 24, 26 confront one another and are in at least approximate axial alignment as shown in FIG. 3-1. While using the tool 100 to hold the sleeve latched therein 34 as shown in FIG. 3-2, a user may longitudinally translate the sleeve 34 in the direction of the arrows, along and around the first fluid carrying member 28 and over the first and second annular flanges 24, 26, until the sleeve 34 circumferentially surrounds and radially seals against the first and second annular sealing members 31, 32 attached with the first and second annular flanges 24, 26, as shown in FIG. 3-3. A user may then unlatch (38) the latchably connectable second ends of the arcuate coupling halves 41, 42, open the pair of arcuate coupling halves 41, 42 by pivoting them away from each other about the first adjacent ends (54) as shown in FIG. 2, and remove the tool 100 from the sleeve 34, leaving the structure with an installed sleeve 34 as shown in FIG. 3-4. With reference to FIGS. 3 and 4 of U.S. Pat. No. 4,008,937 A, separately incorporated herein by reference, a clamshell-style clamp (336 in present FIG. 1) may then be installed around the sleeve 34 in present FIG. 3-4 to fully assemble the coupling 20.

In various example embodiments wherein the arcuate coupling halves 41, 42 further comprise a tapered surface 46 extending from a second end of the inner profile 45, longitudinally away from and radially outward from the second end of the inner profile 45, the method may further comprise the steps of: while using the tool 100 to hold the sleeve 34 latched therein, longitudinally translating the sleeve 34 over the first and second annular flanges 24, 26 so that the tapered surface 46 travels over the first and second annular flanges 24, 26 as shown in FIGS. 3-1 through 3-3. In various example embodiments wherein the coupling 20 comprises a threadless, flexible, self-bonding coupling assembly 20 configured according to SAE Aerospace Standard AS1650, the method may further comprise the steps of clamping a clamshell-style clamp 336 (present FIG. 1) around the sleeve 34 and the first and second annular flanges 24, 26, for instance as illustrated in FIGS. 3 and 4 of U.S. Pat. No. 4,008,937 A, separately incorporated herein by reference.

Further provided in various example embodiments is a method of removing a sleeve 34 as described herein from sealably connecting first and second fluid carrying members 28, 30 as described herein, wherein the method may comprise the steps of: providing a tool 100 as described herein; opening the pair of arcuate coupling halves 41, 42 by pivoting them away from each other about the first adjacent ends 54 as shown in FIG. 2; positioning the sleeve 34 between the pair of arcuate coupling halves 41, 42 (while the sleeve is installed as shown in FIG. 3-4); closing the pair of arcuate coupling halves 41, 42 around the sleeve 34 by pivoting the pair of arcuate coupling halves 41, 42 toward each other about the first adjacent ends (54) so that the inner profile 45 of arcuate coupling halves 41, 42 closely interfaces with and circumferentially surrounds the outer surface 34-o of the sleeve 34 and so the shoulder 44 closely interfaces with and at least partially surrounds the first edge 34-L of the sleeve 34 as shown in FIG. 3-3, and latching together the latchably connectable second ends of the arcuate coupling halves 41, 42, for instance with any suitable latching mechanism 38. Then, while using the tool 100 to hold the sleeve 34 latched therein as shown in FIG. 3-3, the user can longitudinally translate the sleeve 34 over the first and second annular flanges 24, 26 until the sleeve 34 no longer sealably connects the first and second fluid carrying members 28, 30, as shown in FIG. 3-5 (arrows indicating direction).

In various example embodiments the method may further comprise the steps of longitudinally translating the sleeve 34 over the first annular flange 24 while the shoulder 44 passes over and does not interfere with the first annular flange 24, while using the tool 100 to hold the sleeve 34 latched therein, as indicated in FIGS. 3-3 and 3-5. In various example embodiments the method may further comprise longitudinally translating the sleeve 34 over the second annular flange 26 while the shoulder 44 passes over and does not interfere with the second annular flange 26, using the tool 100 to hold the sleeve 34 latched therein, as indicated in FIGS. 3-3 and 3-5. In various example embodiments the method may further comprise the steps of positioning the first and second fluid carrying members 28, 30 so that there is sufficient space between them to remove the sleeve 34 from there between (not shown), and removing the sleeve 34 from between the first and second fluid carrying members 28, 30. In various example embodiments the method may further comprise the steps of unlatching the latchably connectable second ends (38) of the arcuate coupling halves 41, 42, opening the pair of arcuate coupling halves 41, 42 by pivoting them away from each other about the first adjacent ends (54) as shown in FIG. 2, and removing the tool 100 from the sleeve 34, leaving the structure as shown in FIG. 3-6. Note that this step can be performed in conjunction with, separate from, or instead of, the step of removing the sleeve 34 from between the fluid carrying members 28, 30, and if both steps are performed they may be performed in any order. In various example embodiments wherein the coupling 20 may comprise a threadless, flexible, self-bonding coupling assembly configured according to SAE Aerospace Standard AS1650, the example removal method discussed above may be preceded by the steps of unclamping and removing a clamshell-style clamp 336 from around the sleeve 34 and the first and second annular flanges 24, 26.

It is foreseen that packages of tools 100 may be sold as a kit, with different sized tools 100 for different sized couplings 20. For example, couplings 20 are commercially available in standardized sizes, with known sizes of flanges 24, 26 and known sizes of sleeves 34 with known geometries for their outer surfaces 34-o. Accordingly, packets of tools 100 may be constructed with corresponding dimensions according to the principles of the present invention, and sold as a kit to fit a variety of sizes and types of couplings.

Any of the suitable technologies and materials set forth and incorporated herein may be used to implement various example aspects of the invention as would be apparent to one of skill in the art. Although exemplary embodiments and applications of the invention have been described herein including as described above and shown in the included example Figure(s), there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A tool adapted for use in installing and removing a sleeve from a coupling, wherein the sleeve comprises an annular body having an outer surface separated from an inner surface by a thickness and extending longitudinally about a center axis from a first edge to a second edge, the sleeve configured to sealably connect first and second fluid carrying members by circumferentially surrounding and radially sealing against first and second annular sealing members attached with first and second annular flanges on confronting ends of the first and second fluid carrying members;

the tool comprising a pair of arcuate coupling halves pivotally joined at first adjacent ends and latchably connectable at second ends and comprising an inner profile sized and shaped to closely interface with and circumferentially surround the outer surface of the sleeve, the arcuate coupling halves further comprising a shoulder extending radially inward from a first end of the inner profile, the shoulder sized and shaped to closely interface with and at least partially surround the first edge of the sleeve while leaving radial clearance between the shoulder and the first and second annular flanges.

2. The tool of claim 1, wherein the outer surface of the sleeve comprises annular first ridges and first grooves spaced apart longitudinally about the center axis, and wherein the inner profile of the arcuate coupling halves comprises annular second grooves and second ridges sized and shaped to closely interface with the respective annular first ridges and first grooves in the outer surface of the sleeve.

3. The tool of claim 1, wherein the arcuate coupling halves further comprise a tapered surface extending from a second end of the inner profile, longitudinally away from and radially outward from the second end of the inner profile.

4. The tool of claim 1, wherein the arcuate coupling halves are pivotally joined at the first adjacent ends by a hinge connected to an outer profile of the arcuate coupling halves.

5. The tool of claim 1, wherein the arcuate coupling halves are latchably connectable at the second ends by a latching mechanism connected to an outer profile of the arcuate coupling halves.

6. The tool of claim 1, wherein the arcuate coupling halves further comprise an annular outer profile.

7. The tool of claim 1, wherein the arcuate coupling halves further comprise an outer profile having dimensional variations configured to facilitate a user gripping the tool.

8. The tool of claim 1, wherein the first and second annular sealing members comprise resilient O-rings positioned in grooves in the first and second annular flanges.

9. The tool of claim 1, wherein the first and second annular sealing members comprise deformable packings positioned in grooves in the first and second annular flanges.

10. The tool of claim 1, wherein the coupling comprises a threadless, flexible, self-bonding coupling assembly configured according to SAE Aerospace Standard AS1650, and the inner profile of the pair of arcuate coupling halves is sized and shaped to closely interface with and circumferentially surround the outer surface of a sleeve forming part of a threadless, flexible, self-bonding coupling assembly configured according to SAE Aerospace Standard AS1650.

11. A method of installing the sleeve of claim 1 to sealably connect the first and second fluid carrying members of claim 1, comprising the steps of:

providing the tool of claim 1;

opening the pair of arcuate coupling halves by pivoting them away from each other about the first adjacent ends;

positioning the sleeve between the pair of arcuate coupling halves;

closing the pair of arcuate coupling halves around the sleeve by pivoting the pair of arcuate coupling halves toward each other about the first adjacent ends so that the inner profile of arcuate coupling halves closely interfaces with and circumferentially surrounds the outer surface of the sleeve and so the shoulder closely interfaces with and at least partially surrounds the first edge of the sleeve;

latching together the latchably connectable second ends of the arcuate coupling halves;

positioning the first and second fluid carrying members so that the first and second annular flanges confront one another and are in at least approximate axial alignment;

while using the tool to hold the sleeve latched therein, longitudinally translating the sleeve along and around the first fluid carrying member and over the first and second annular flanges until the sleeve circumferentially surrounds and radially seals against the first and second annular sealing members attached with the first and second annular flanges;

unlatching the latchably connectable second ends of the arcuate coupling halves;

opening the pair of arcuate coupling halves by pivoting them away from each other about the first adjacent ends; and removing the tool from the sleeve.

12. The method of claim 11, wherein the arcuate coupling halves further comprise a tapered surface extending from a second end of the inner profile, longitudinally away from and radially outward from the second end of the inner profile, the method further comprising the steps of:

while using the tool to hold the sleeve latched therein, longitudinally translating the sleeve over the first and second annular flanges so that the tapered surface travels over the first and second annular flanges.

13. The method of claim 11, wherein the coupling comprises a threadless, flexible, self-bonding coupling assembly configured according to SAE Aerospace Standard AS1650, further comprising the steps of clamping a clamshell-style clamp around the sleeve and the first and second annular flanges.

14. A method of removing the sleeve of claim 1 from sealably connecting the first and second fluid carrying members of claim 1, comprising the steps of:
  providing the tool of claim 1;
  opening the pair of arcuate coupling halves by pivoting them away from each other about the first adjacent ends;
  positioning the sleeve between the pair of arcuate coupling halves;
  closing the pair of arcuate coupling halves around the sleeve by pivoting the pair of arcuate coupling halves toward each other about the first adjacent ends so that the inner profile of arcuate coupling halves closely interfaces with and circumferentially surrounds the outer surface of the sleeve and so the shoulder closely interfaces with and at least partially surrounds the first edge of the sleeve;
  latching together the latchably connectable second ends of the arcuate coupling halves;
  while using the tool to hold the sleeve latched therein, longitudinally translating the sleeve over the first and second annular flanges until the sleeve no longer sealably connects the first and second fluid carrying members.

15. The method of claim 14, further comprising the steps of:
  while using the tool to hold the sleeve latched therein, longitudinally translating the sleeve over the first annular flange while the shoulder passes over and does not interfere with the first annular flange.

16. The method of claim 15, further comprising the steps of:
  while using the tool to hold the sleeve latched therein, longitudinally translating the sleeve over the second annular flange while the shoulder passes over and does not interfere with the second annular flange.

17. The method of claim 14, further comprising the steps of:
  positioning the first and second fluid carrying members so that there is sufficient space between them to remove the sleeve from there between; and
  removing the sleeve from between the first and second fluid carrying members.

18. The method of claim 14, further comprising the steps of:
  unlatching the latchably connectable second ends of the arcuate coupling halves;
  opening the pair of arcuate coupling halves by pivoting them away from each other about the first adjacent ends; and
  removing the tool from the sleeve.

19. The method of claim 14, wherein the coupling comprises a threadless, flexible, self-bonding coupling assembly configured according to SAE Aerospace Standard AS1650, the method further comprising the steps of unclamping and removing a clamshell-style clamp from around the sleeve and the first and second annular flanges.

\* \* \* \* \*